Figure 1:
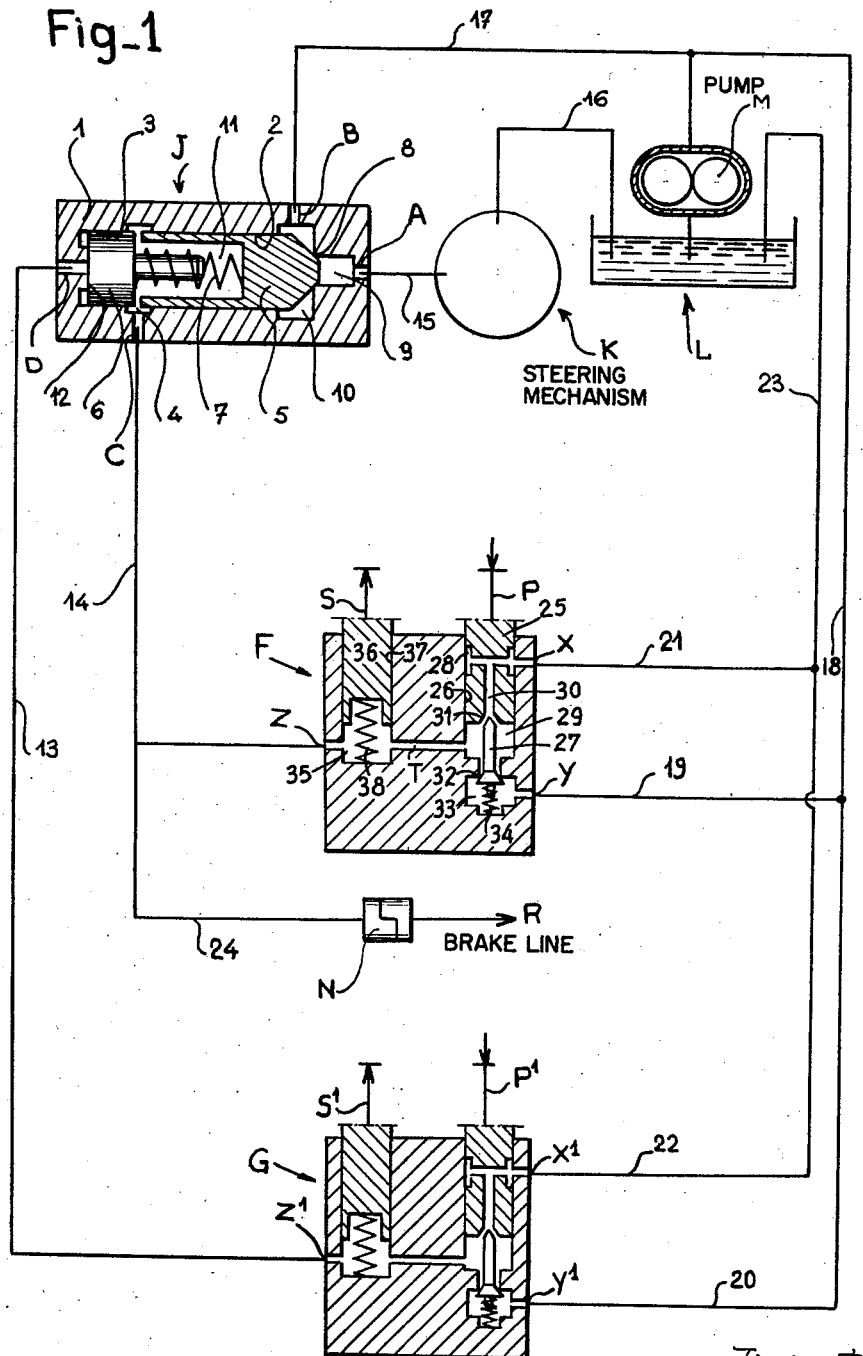

May 5, 1964 L. PÉRAS 3,131,607
SERVO-ACTION APPARATUS
Filed Aug. 24, 1961 2 Sheets-Sheet 2

Inventor
Lucien Péras
By Stevens Davis Miller & Mosher
Attorneys

United States Patent Office

3,131,607
Patented May 5, 1964

3,131,607
SERVO-ACTION APPARATUS
Lucien Péras, Billancourt, France, assignor to Regie Nationale des Usines Renault, Billancourt, France
Filed Aug. 24, 1961, Ser. No. 133,646
Claims priority, application France Sept. 2, 1960
7 Claims. (Cl. 91—376)

This invention relates to servo-action means for actuating clutch, braking and steering systems of automotive vehicles, notably farming tractors and the like. It is concerned primarily with a hydraulic circuit comprising devices adapted to control the above-defined functions, these devices being supplied simultaneously with fluid under pressure from a central distributor coacting with a pump and a reservoir so that the fluid pressure has its minimum value in the inoperative position and a constant maximum value limited by the brake application or clutch release time with priority of fluid feed to these two functions while constantly ensuring the normal operation of the steering servo-action.

A servo-action control device of the so-called "closed centre" type is applied in the same form to the control of both clutch and braking systems. It acts, within the same body, both as a hydraulic cylinder or ram having its cylinder connected to a control circuit of the central distributor, and as a distributor proper connected on the one hand to the pump outlet and on the other hand to the reservoir, this member being responsive to the brake (or clutch) pedal.

The servo-action device of the so-called "open centre" type, is mounted between the aforesaid central distributor and the reservoir. The central distributor consists of a body formed with a bore in which two pistons are slidably fitted and responsive to a compression spring constantly urging said pistons away from each other, the outer end of the first piston being shaped to constitute a tapered valve member engaging a seat controlling a passage interconnecting a chamber connected to the pump outlet and another chamber connected to said servo-action device. This valve member yields against the spring pressure when the pressure prevailing in one or the other chamber attains a sufficient value so that, when the other piston is inoperative a maximum constant pressure of the order of 70 p.s.i. is obtained in the line leading from the pump outlet. However, when the brake pedal for example is depressed this pressure is increased considerably due to the action of the fluid flowing (under the pump pressure) through the line from the ram cylinder of the braking servo-action device to a chamber of the central distributor which is formed between the two pistons thereof, whereby the valve portion of the first piston is locked in its seated position. A similar action is obtained when the clutch pedal is depressed; in this case, the fluid under pressure is delivered against the outer end of the other piston which is thus caused to engage the first piston and close the braking circuit delivery port, so that the braking and clutch actions will not interfere with each other.

The servo-action device is rendered operative by a distributor producing a temporary throttling in the return line leading to the fluid reservoir, thus increasing the fluid pressure in the chambers of the central distributor which are located in front of the valve portion of said first piston and causing this valve portion to recede and provide the control pressure necessary for actuating the steering mechanism proper.

Figure 2:
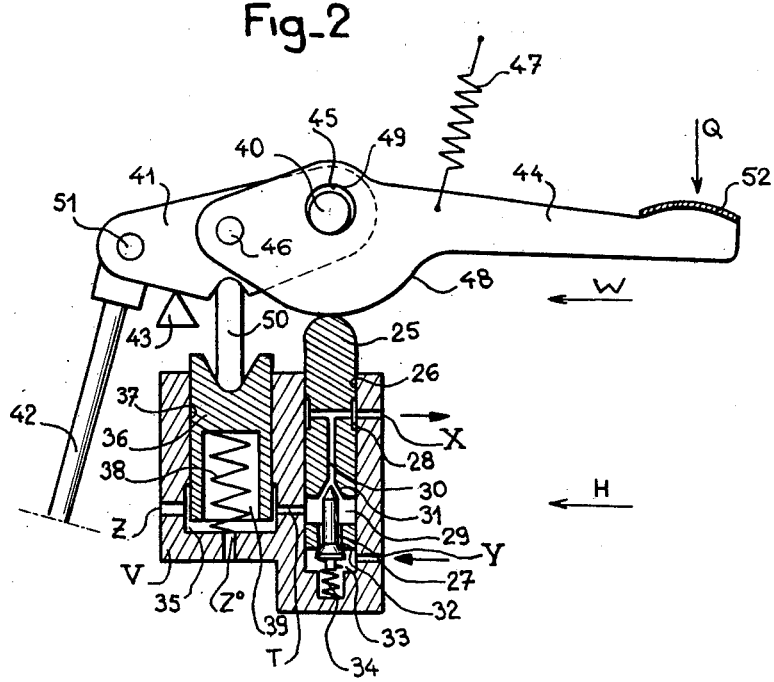
Figure 3:
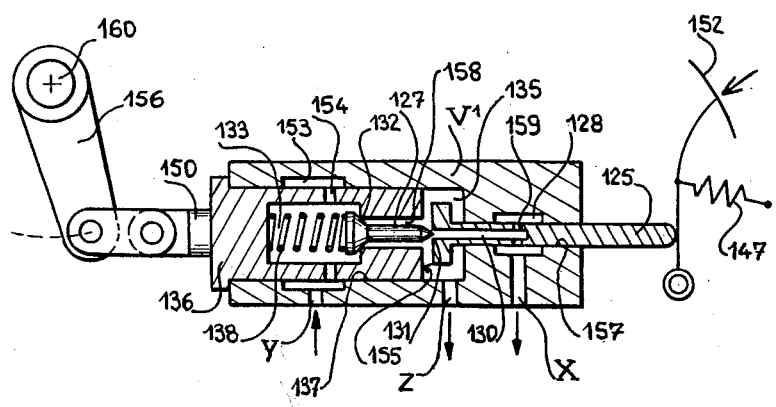

Different forms of embodiment of the invention will now be described by way of illustration with reference to the accompanying drawings in which:

FIGURE 1 is a general diagram showing a hydraulic circuit constructed according to the teachings of this invention, and FIGURES 2 and 3 are diagrammatic detail views showing two different forms of embodiment of the servo-action control device, which are applicable to a braking system (FIG. 2) and to a clutch mechanism (FIG. 3).

Referring first to FIGURE 1, the two operatively identical servo-action devices of the so-called "closed centre" type for operating the braking system and clutch mechanism are shown in block form and designated by the reference letters F and G. The device or unit F comprising a combined hydraulic cylinder or ram and a distributor comprises a projecting rod P responsive to the brake pedal, a control rod S actuating the braking system and three ports X, Y, Z of which the last one Z is connected to the ram cylinder actuating the rod S.

In unit F, these three ports are interconnected as follows:

When P is raised (brake pedal inoperative) Y is isolated and Z communicates with X.

When P is depressed, X is isolated, Z communicates with Y and the pressure Y—Z pushes P and S back (so that the force to be overcome through the pedal is constantly proportional to the braking effort). Moreover, the pedal must move in unison with the braking movement or stroke and to this end the pedal should sink as rod S rises.

The same applies to unit G of which the component elements $P^1$, $S^1$, $X^1$, $Y^1$ and $Z^1$ which are respectively similar to the elements P, S, X, Y, Z of unit F and are associated as in F (except that $P^1$ is pushed through the clutch pedal and $S^1$ actuates the clutch control member).

The circuit of FIGURE 1 comprises in addition a central distributor J, a steering servo-action mechanism K of the so-called "open centre" type, a pump M and a reservoir L. The reference character R designates a brake line for a trailer and N is a junction valve associated therewith.

The distributor J consists of a body 1 formed with a pair of aligned co-axial bores 2, 3 separated by a circular groove 4 in which the pistons 5, 6 are slidably mounted respectively, a compression spring 7 urging said pistons away from each other.

At its outer end the piston 5 is valve-shaped with a view to co-act with a seat 8 formed in a passage between two chambers 9 and 10, as shown. Under the influence of a pressure prevailing in chamber 9 or in chamber 10, the piston 5 is moved against the elastic resistance of spring 7. Intermediate the two pistons 5 and 6 is another chamber 11 communicating with the circular groove 4 when the two pistons are spaced from each other.

The outer end of piston 6, in the inoperative condition (i.e. when the clutch pedal is released), engages a flat seat or face 12 formed in the corresponding end of body 1 and having a central orifice D communicating with a line 13 connected to the orifice $Z^1$ of the clutch servo-action unit G.

The groove 4 communicates with the outside through an orifice C connected to a line 14 leading to the port Z of the brake servo-action unit F.

Chamber 9 is connected through an orifice A and a line 15 to the steering servo-action mechanism K communicating in turn through a line 16 with the discharge reservoir L.

Chamber 10 communicates through an orifice B and lines 17, 18, 19 and 20 with the outlet of pump M and also with the inlet orifices Y and $Y^1$ of servo-action units F and G.

The discharge orifices X and $X^1$ of units F and G are furthermore connected through lines 21, 22 and 23 to reservoir L.

The brake line 14 may, if desired, be connected to the trailer braking systems R through an additional line 24 and a junction valve N.

The above-described device operates as follows:

In the neutral position, the brake and clutch pedal are released and rods P and P¹ are in their upper-most position.

The hydraulic fluid delivered from pump M is fed to chamber 10 and in order to flow from this chamber through the line 15 to the steering servo-action mechanism and to the reservoir it pushes the piston 5 to the left from the position shown in FIGURE 1 whereby, as a consequence of the provision of spring 7, a minimum constant pressure, for example of the order of 70 p.s.i., builds up in lines 17, 18, 19, 20 wherein the hydraulic fluid is blocked in said lines since ports Y and Y¹ are isolated in units F and G respectively.

The rods S and S¹ of the hydraulic cylinders of units F and G are inoperative since their corresponding cylinders are exhausted through the internal passages Z—X and Z¹—X¹.

When servo-power is required for operating the steering system, a throttle in the steering system servo-action produces a pressure increment throughout the hydraulic circuit and piston 5 in FIGURE 1 is thus moved to the left.

This pressure is also communicated through lines 17, 18, 19 and 20 to units F and G, but without actuating the braking systems or the clutch, since ports Y and Y¹ are closed.

When the brake pedal is depressed, rod P sinks into unit F, port X is closed and Y is connected with Z.

Thus, the pressure prevailing in chamber 10 of the central distributor (whether this pressure is due to the operation of the steering servo-action mechanism or to the aforesaid 70 p.s.i. pressure produced by the spring 7 of valve 5—8) is transmitted through the ports, ducts, connecting lines and grooves B, 17, 18, 19, Y—Z, 14, C and 4 to chamber 11.

Under these conditions, as the pressures in chambers 10 and 11, that is on either sides of valve member 5 of valve assembly 5—8 are equal, this valve member is seated by spring 7 and engages its seat 8 with a greater force, thus causing a pressure increment throughout the circuit.

The ratio of the cross-sectional areas of valve member 5 on which the different pressures are exerted is so calculated that the maximum pressure in chamber 10 is of the order of 1,400 p.s.i.

This pressure is transmitted through Y—Z to the hydraulic brake cylinder and actuates the brake system through the rod S.

As those conversant with the art will readily understand, the effort transmitted from S is always proportional to the effort exerted by the driver on the brake pedal.

When the brake pedal is released, Z is again connected to X, thus discharging chamber 11 and the brake-ontrolling cylinder, and Y is again isolated, thus restoring chamber 11 to the initial pressure.

By providing a branch line 24 and a junction valve N it is possible to actuate the brakes of a trailer simultaneusly with those of the tractor vehicle.

The clutch servo-action operation is similar to the brake servo-action operation, as unit G operates exactly like unit F.

However, in order to avoid any side-effects on the braking system when the clutch servo-action is produced, as a consequence of the corresponding pressure increment, the piston 6 acting as a separator member receives through D the thrust produced by the fluid pressure and transmits the effort received to piston 5 without delivering any pressure through 4, C, 14 and Z to unit F.

It is also this piston 6 which, during a brake application, will prevent the braking pressure from acting upon the clutch servo-action unit G.

If the brake pedal is depressed when the clutch is being operated, the brake operation is obtained through the pressure already built up in line 18.

Conversely, when the clutch is operated during a brake application, the pressure already existing in lines 18 and 20 is also utilized to this end.

Now two typical forms of embodiments of the servo-action units such as F and G utilized in the circuit of FIGURE 1 described hereinabove will be considered in greater detail with reference to FIGURES 2 and 3.

In the first example illustrated in FIGURE 2, the servo-action unit comprises a hydraulic member H incorporating in a common body V a distributor and a ram of known types, together with a mechanical device W for actuating the hydraulic member H. The distributor is comprised of a cylindrical push-rod 25 slidably engaging a bore 26 formed in the body and adapted to engage from underneath the valve member 27 of a two-seat valve system. The push-rod 25 is formed intermediate its ends with a circular groove 28 communicating externally with the exhaust through the port X of the body and internally with a chamber 29 through a central or axial duct 30 formed in the push-rod. The valve member 27 extends through this chamber 29 and its frusto-conical valve forming and registers with the first seat 31 consisting of an outflared or countersunk lower edge of the aforesaid axial duct 30.

The other seat 32 of valve member 27 is adapted to isolate chamber 29 from another chamber 33 formed in the lower portion of bore 26 and communicating with the pressure fluid inlet port Y of the device.

When push-rod 25 is inoperative, valve member 27 is constantly urged for engagement with its second seat 32 both by the fluid pressure in chamber 33 and by the force of a compression coil spring 34; under these conditions the first seat 31 is raised (that is, clear from valve member 27) and chamber 29 communicates with the discharge or exhaust line through duct 30, groove 28 and port X.

When the push-rod 25 is depressed, the upper or first seat 31 engages the registering end of valve member 27, thus isolating chamber 29 from the exhaust line; then valve member 27 moves downwards away from seat 32 and thus fluid under pressure is allowed to penetrate into chamber 29. This chamber communicates through duct T with the ram cylinder 35 in which a piston 36 is a slide fit in bore 37 and urged upwards by a spring 38 housed in a cavity 39 formed in this piston.

The hydraulic member H according to this invention is characterized by at least one orifice such as T or Z.

In the example illustrated, the orifice Z is supplemented by another orifice Z⁰ which may be utilized for a trailer (in this case the line 24 of FIGURE 1 will be connected directly to Z⁰).

However, the servo-action mechanism incorporating the hydraulic member H comprises furthermore a mechanical device W to be described hereunder.

A fixed pin 40 overlying the push-rod 25 of hydraulic device H and extending at right angles thereto is mounted without play in a movable member 41 pivotally connected through a pin 51 on the control rod 42 of the braking system or clutch mechanism, a stop 43 limiting the movement of this member 41 in one direction. Through its bore 49 the pedal 44 is pivotally mounted with a clearance 45 on the same pin 40 and the member 41 carries a pin 46 on which is fulcrumed the pedal 44 movable within the limits permitted by this clearance 45, above the pin 40.

In this initial position, this clearance is maintained by a spring 47 holding the pedal in its uppermost position.

The operative connection between the push-rod 25 of the distributor and the control pedal is provided by a suitable cam contour 48 concentric to the bore 49, whereby the depression of the distributor push-rod cannot exceed the aforesaid clearance 45, irrespective of the pedal position.

The piston 36, through an intermediate member 50, acts upon the member 41 so as to urge same for rotation about the pin 40 to pull the control rod 42.

This mechanism operates as follows:

When the pedal is fully released, the push-rod 25 does not exert any pressure on valve member 27 so that X is connected through groove 28, duct 30 and the open valve 27—31, chamber 29, duct T and chamber 35 with port Z. On the other hand, port Y is isolated by the closed valve 27—32.

When the pedal is depressed, it revolves about the axis of pin 46 and push-rod 25 is forced downwards to close valve 27—31 and isolate port X, then it opens the valve assembly 27—32, whereby Y communicates with Z through chamber 33, open valve 27—32, chamber 29, duct T and chamber 35; under these conditions piston 36 and push-rod 25 are both responsive to the fluid pressure prevailing between Y and Z. The pedal follows the braking movement and descends as piston 36 rises.

Thus, the functions of both units F or G are obtained in the general hydraulic circuit described hereinabove with reference to FIGURE 1.

When the upward pedal movement is stopped at a given position, the fluid pressure exerted on the push-rod causes the latter to rise, so as to close the valve unit 27—32.

In this case no output obtains in the distributor.

When the pedal is released, Z communicates again with X, and Y is isolated: therefore, the initial connections are restored.

The pressure again becomes zero and the complete assembly resumes its initial position due to the action of the return spring 47.

In case of failure of the hydraulic servo-action system, when the pedal is depressed the clearance 45 is reduced to zero, the upper portion of bore 49 bears on pin 40, and the effort Q exerted centrally of the pedal actuating surface 52 transmits to rod 42 a force $$Q' = Q \times \frac{a}{b}$$

wherein $a$ is the distance measured from 40 to 52 and $b$ the distance measured from 40 to 51.

In another form of embodiment of the brake or clutch servo-action device described by way of example herein with reference to FIGURE 3, the push-rod 125, valve member 127, piston 136 and the brake (or clutch) actuating rod 150 are mounted in relative axial alignment in a common body $V^1$.

This body is formed with ports X, Y and Z which, in cooperation with the push-rod 125 and ram rod 150 perform the functions in similar manner as devices F and G of FIGURE 1 (and obtained with the device described with reference to FIGURE 2).

To this end, the body $V^1$ is formed with two axially aligned bores 137 and 157, the first bore 137 having a piston 136 slidably fitted therein. This piston is formed with an inner chamber 133 constantly connected to the port Y of the body through orifices 154 formed in the piston and a groove 153 formed in the body, as shown. This inner chamber 133 communicates through a cylindrical duct 158 with the inner face 155 of piston 136, the inner end of this duct 158 being bevelled to constitute a valve seat engageable by a valve member 127 having a valve head urged to its seated position by a spring 138 and provided with a shank extending with a suitable clearance through the aforesaid cylindrical duct 158, this shank having formed on its end portion opposite to the valve head another tapered valve portion engaging another seat 131 formed on the inner end face of push-rod 125. This push-rod 125 is slidably fitted in the other bore 157 of body $V^1$.

The double valve system 127—131 controls the communication between chamber 135 (located between the bottom 155 of piston 136 and the bottom of bore 137) and port X through duct 130, and the ports 159 of the push-rod and also through the groove 128 of the body. Chamber 135 communicates continuously with port Z. The push-rod 125 receives the thrust from pedal 152 urged by a spring 147. The piston rod 150 actuates the brake (or clutch) control linkage through a lever 156 causing for example the rotation of a pin 160.

This device operates as follows:

When no pressure is exerted by the pedal on push-rod 125, the orifice Y is isolated (by closing valve member 127—132) and the ports Z and X communicate with each other through chamber 135, open valve 127—131, duct 130, orifices 159 and groove 128.

When the pedal is depressed, the push-rod 125 begins to recede into the body $V^1$, and the seat 131 engages the valve-forming shank end of valve member 127, thus isolating port X, and then lifts valve 127 from its seat 132, and causing Y to communicate with Z. The pressure increment thus obtained in the ducts and cavities located— in this apparatus—between Y and Z has the immediate consequence of moving piston 136 by actuating the braking system (or the clutch) and to apply to the push-rod 125 a force reacting against the pedal movement which is proportional to the braking (or clutch-operating) effort.

Moreover, the pedal follows the movements of piston 136 through the medium of push-rod 125.

When the pedal is held in any intermediate position the valve 127—132 closes and the delivery of fluid under pressure to the distributor through port Y is discontinued.

When the pedal is released, the push-rod 125 recedes, thus opening the valve assembly 127—131 to restore the communication Z—X (in order to discharge the chamber 135 of the hydraulic cylinder), and the valve assembly 127—132 is closed, thus isolating the fluid supply at Y.

In case of failure of the pump supplying hydraulic fluid to the hydraulic circuit, the push-rod 125 engages the inner face 155 of piston 136 and the effort exerted on pedal 152 is transmitted through a mechanical linkage to the brake (or clutch) control system.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Servo-action apparatus for controlling a clutch mechanism, braking system and steering apparatus of vehicles comprising a hydraulic circuit including a central distributor therein for delivering fluid under pressure simultaneously to devices for performing the clutch release, braking and steering operations, said central distributor co-operating with a pump and a reservoir, said central distributor comprising a body including a bore in which two pistons are slidably mounted and urged away from each other by elastic means, a first chamber disposed in said body and being operatively connected to said pump, a second chamber disposed in said body and being operatively connected to a steering actuating device, one of said pistons including a valve portion disposed within said first chamber and engaging under the action of said elastic means a seat disposed in said second chamber, groove means disposed in said body between said two pistons and communicating with an actuating device, another seat disposed in said body against which the other piston engages under the action of said elastic means, and orifice means communicating with said last named seat as well as with a further actuating device.

2. Servo-action apparatus according to claim 1 in which said first mentioned actuating device comprises a body element having disposed therein a first piston and a second piston adjacent each other, one of said first and second pistons having disposed therein a valve member and at least one seat, spring means urging said valve member into engagement with said one seat, first chamber means disposed in said body element which includes said one seat communicating with said pump, second chamber means disposed in said body element communicating with said central distributor, an axial duct disposed in one of said first and second pistons, groove means disposed in said body element communicating between said reservoir and said axial duct, and mechanical means engaging one of said first and second pistons to move same against said valve member to cause said first and second chamber means to be interconnected.

3. Servo-action apparatus according to claim 2 in which said first and second pistons are disposed in said body element in side-by-side relationship.

4. Servo-action apparatus according to claim 2 in which said first and second pistons are disposed in said body element in axial relationship.

5. Servo-action apparatus according to claim 2 in which seat means is disposed in one end of said axial duct which engages said valve member upon movement thereagainst.

6. Servo-action apparatus according to claim 2 in which said mechanical means includes a first lever having one end pivoting without play about a fixed pin, the other end of said first lever pivotally connected to a rod operatively connected to one of said actuating devices, a second lever having at one end an actuating pedal, said second lever being pivotally mounted on said fixed pin with a predetermined clearance, the other end of said second lever being fixedly connected to a movable pin solid with said first lever, a spring element operatively connected to one of said levers to maintain said actuating pedal in an inoperative position, and cam means disposed on said second lever for engaging one of said first and second pistons upon actuation of said actuating pedal.

7. Servo-action apparatus according to claim 2 in which said mechanical means includes a first lever pivotally mounted adjacent one of said first and second pistons and having an actuating pedal thereon, a spring element operatively connected to said first lever to maintain same in an inoperative position, a piston rod connected to the other of said first and second pistons, and a second lever operatively connected between said piston rod and one of said actuating devices to actuate same upon said first lever being actuated to thereby engage the one of said first and second pistons.

No references cited.